United States Patent [19]

Shiozaki et al.

[11] Patent Number: 4,840,746

[45] Date of Patent: Jun. 20, 1989

[54] LIQUID CLEANSER COMPOSITION CONTAINING AN ABRASIVE CRYSTALLINE ALUMINOSILICATE ZEOLITE AGGREGATE

[75] Inventors: Ryozi Shiozaki, Matsudo; Atsuhiko Kaji, Ichikai; Hiroyuki Saijo; Katsuhiko Deguchi, both of Utsunomiya, all of Japan

[73] Assignee: Kao Corporation, Tokyo, Japan

[21] Appl. No.: 86,365

[22] Filed: Aug. 17, 1987

[30] Foreign Application Priority Data

Sep. 3, 1986 [JP] Japan ............................... 61-207139
Sep. 3, 1986 [JP] Japan ............................... 61-207140

[51] Int. Cl.[4] ......................... C09G 1/02; C11D 3/14; C11D 9/20; C11D 17/08

[52] U.S. Cl. .................................. 252/174.25; 134/6; 134/42; 252/120; 252/131; 252/140; 252/155; 252/173; 252/174.19; 252/548; 252/559; 252/DIG. 14; 423/328

[58] Field of Search ................................ 252/174-25, 252/140, 131, 120, 155, 173, 174.19, 548, 559, DIG. 14; 423/328, 328 C; 502/527; 134/6, 42

[56] References Cited

U.S. PATENT DOCUMENTS

| | | | |
|---|---|---|---|
| 4,203,857 | 5/1980 | Dugan | 252/174 |
| 4,240,919 | 12/1980 | Chapman | 252/95 |
| 4,248,728 | 2/1981 | Paryear | 252/179 |
| 4,333,771 | 6/1982 | Altenschopfer et al. | 134/7 |
| 4,508,633 | 4/1985 | Strenapel et al. | 252/135 |
| 4,537,604 | 8/1985 | Dawson | 51/298 |

FOREIGN PATENT DOCUMENTS

| | | |
|---|---|---|
| 1503363 | 3/1978 | United Kingdom . |
| 2126600 | 3/1984 | United Kingdom . |

*Primary Examiner*—Dennis Albrecht
*Assistant Examiner*—Ron A. Krasnow
*Attorney, Agent, or Firm*—Flynn, Thiel, Boutell & Tanis

[57] ABSTRACT

A liquid cleanser composition comprises 1 to 20 percent by weight of a surfactant and 3 to 70 percent by weight of a water-insoluble abrasive of the interpenetrated crystalline aluminosilicate zeolite crystals, composed of at least 30 crystals formed into an aggregate.

13 Claims, No Drawings

LIQUID CLEANSER COMPOSITION CONTAINING AN ABRASIVE CRYSTALLINE ALUMINOSILICATE ZEOLITE AGGREGATE

The present invention relates to a liquid cleanser composition exhibits excellent detergency and abrasiveness and hardly scratches the surface of an object.

Statement of the Prior Art

The types of dirt to be cleansed with a cleanser include denatured or burnt oil, slimy dirt of a sink, soap scum of a bathtub and the like. On the other hand, many of the objective surfaces to be cleansed therewith are made of easily scratchable materials, for example, metal such as stainless steel or glass fiber-reinforced plastic (FRP). The cleansers of the prior art can not very effectively clean these various types of dirts without scratching the objective surface.

Up to this time, silicate or calcium carbonate having an average particle size of 15μ or above has generally been used as an abrasive in a cleanser, while theones having an average particle size of less than 15μ has not been used, because they exhibit poor abrasiveness, although they scratch objective surface less. Although zeolite is known as an abrasive having an average particle size of less than 15μ (see Japanese Patent Laid-Open Nos. 50909/1976 and 5947/1980), it has not been put to practical use as yet, because of its poor abrasiveness. Simultaneous use of an abrasive having a high hardness, such as silicate, and an abrasive having a low hardness, such as calcium carbonate or zeolite, has generally been made in order to obtain a cleanser satisfying the two requirements of high abrasiveness and less scratching. However, no simultaneous use of two or more abrasives having a low hardness has practically been made, because such simultaneous use has been thought to bring about lowering in abrasiveness.

SUMMARY OF THE INVENTION

The inventors of the present invention have eagerly investigated and have found that a cleanser exhibiting detergency equivalent or superior to that of the cleansers of the prior art against a wide variety of dirts to give a glossy finish without scratching the objective surface can be surprisingly obtained by simultaneously using specific abrasives having a fine particle size and a low hardness with a specific ratio, although this fact is not in accordance with the existing common sense. The present invention has been accomplished on the basis of this finding.

A liquid cleanser composition of the invention comprises 1 to 20 percent by weight of a surfactant and 3 to 70 percent by weight of a water-insoluble abrasive of the interpenetration type, composed of at least 30 crystals formed into an aggregate.

The invention includes two preferable embodiments. The first embodiment is a composition characterized by comprising 3 to 40 percent by weight of the abrasive. The second one is characterized by further comprising calcium carbonate having an average particle size of 3 to 15 microns, a weight ratio of the cyrstalline aluminosilicate to the calcium carbonate ranging from 10/90 to 50/50, the total amount of the crystalline aluminosilicate and the calcium carbonate being from 20 to 70 percent by weight.

The first embodiment will be below explained.

The present invention provides a liquid cleanser composition characterized by containing 1 to 20% by weight of a surfactant and 3 to 40% by weight of a water-insoluble abrasive in the form of an aggregate of an interpenetration type formed of at least 30 crystals.

The water-insoluble abrasive to be used according to the present invention will be described by referring to aluminosilicate by way of example.

The crystalline aluminosilicate to be used according to the present invention is in the form of an aggregate of an interpenetration type formed of at least 30 cubic crystals penetrating to each other. The average particle size thereof is preferably 3 to 12μ and it is still preferable that the content of particles having a size of 40μ or above is less than 5%. The cubic crystal constituting an aggregate generally has a side of 0.2 to 5μ and its corners and edges are preferably roundish.

Thus, it is preferable that the aluminosilicate to be used according to the present invention comprises an aggregate having many corners and a suitable particle size, presumably because such an aluminosilicate can come into contact with dirt at many points or because the force applied can be effectively transmitted.

When silicon dioxide or calcium carbonate, which have been used up to this time, is used as an abrasive, no cleanser satisfying a sufficiently high detergency and reduced scratching of the objective surface can be obtained, even if its particle size is controlled somehow or other. Thus it is rather a matter of the particle shape.

When a crystalline aluminosilicate in the form of a single cube is used as an abrasive, no cleanser exhibiting a sufficiently high detergency and hardly scratching the surface can be obtained independently upon the particle size of the aluminosilicate, either. Further, when a crystalline aluminosilicate in the form of an aggregate formed of less crystals is used as an abrasive, no cleanser satisfying the above two requirements with respect to detergency and scratching can be obtained.

The above crystalline aluminosilicate to be used in the present invention can be prepared by mixing an aqueous solution of sodium aluminate with an aqueous solution of sodium silicate and subjecting the obtained mixture to crystallization from hot water (see Japanese Patent Laid-Open No. 26917/1984). The aqueous solution of sodium aluminate may have a high concentration of 30 to 70% by weight, while the aqueous solution of sodium silicate may have a high concentration of 35 to 50% by weight. The both solutions may be mixed with each other so as to give a ratio of $Na_2O$ to $Al_2O_3$ to $SiO_2$ to $H_2O$ of 1.0 to 2.0:1:1.5 to 2.5:15 to 30, thus forming an aluminosilicate slurry.

If the above solutions each have too low a concentration, no satisfactory aggregate will be formed, while if they each have too high a concentration, the resulting aggregate will be too coarse.

The sodium silicate to be used in the present invention may have various ratios of Si to Na. Accordingly, commercial available Sodium Silicates No. 1, 2 and 3 may be used as such in the present invention, though the use of Sodium Silicates No. 2 and 3 are preferred from the standpoint of the whole molar ratios.

According to the present invention, the two solutions must be mixed sufficiently. In order to attain the sufficient mixing, a high-performance mixer such as a line mill, a gear pump, a turbine pump or a Ledegue mixer is preferably used.

The reaction is preferably carried out by gradually adding an aqueous solution of sodium aluminate to an aqueous solution of sodium silicate under vigorous stirring. Alternatively, it is also preferably carried out by adding both the solutions simultaneously to an aluminosilicate slurry which has been preliminarily prepared.

The reaction temperature is 50° to 90° C., preferably 60° to 80° C. If the temperature is too low, coarse particles will be generated, while if it is too high, crystallization will occur, the both being unfavorable. The best result was obtained by adding an aqueous solution of sodium silicate having an ordinary temperature simultaneously with a supersaturated aqueous solution of sodium aluminate of a temperature of 50° to 90° C. to a reactor kept at 50° to 90° C. The reaction may be carried out either by a batchwise method or by a continuous one.

Although the time taken for the addition of the solutions varies depending upon the amount thereof to be fed, it is 10 to 180 minutes, preferably 15 to 60 minutes. After the completion of the addition, the obtained mixture is preferably stirred for additional 10 to 60 minutes to accelerate the homogenization of the gel. After the completion of the gelling, the resulting gel is heated to a temperature of 70° to 110° C., preferably 80° to 100° C. and kept at that temperature for 15 to 120 minutes, preferably 20 to 60 minutes to thereby carry out the crystallization of aluminosilicate (zeolite 4A), thus forming a slurry. In this step, the application of too long a crystallization time or too high a crystallization temperature is in danger of converting zeolite 4A into hydroxysodalite hvaing no ion exchange power.

According to the present invention, a suitable dispersant, for example, acrylic (co)polymer having a molecular weight of 500 to 10000, may be added in order to reduce the viscosity of the reaction mixture. After the crystallization, the obtained slurry may be added as such or, if necessary, after neutralization to a slurry base for a powdered detergent. The neutralization may be carried out with carbon dioxide gas or an unneutralized anionic surfactant (S agent) (for example, unneutralized alkylbenzenesulfonic acid). Carbon dioxide gas may be directly blown into the reaction vessel or may be mixed with the slurry circulated in a static mixer. Further, the neutralization of the slurry may be partially carried out with carbon dioxide gas, followed by the completion thereof with the S agent.

The slurry of the crystalline aluminosilicate of an interpenetration type thus prepared may be compounded as such with a detergent component. Alternatively, the slurry may be dried into a powder before compounding.

Examples of the surfactant to be used in the present invention include anionic, nonionic, cationic and amphoteric ones, among which anionic and nonionic ones are particularly preferred.

The anionic surfactant to be used in the present invention include ordinary sulfonate, sulfate and phosphate surfactants. Examples of the anionic sulfonate surfactant include salts of straight-chain or branched alkyl ($C_{8\sim23}$) benzene-sulfonic acids, long-chain alkyl($C_{8\sim22}$) sulfonic acids and long-chain olefin($C_{8\sim22}$) sulfonic acids and examples of the anionic sulfate surfactant include salts of long-chain monoalkyl($C_{8\sim22}$) sulfates, sulfates of polyoxyehtylene(1 to 6 mol) long-chain alkyl($C_{8\sim22}$) ether and sulfates of polyoxyethylene(1 to 6 mol) alkyl ($C_{8\sim18}$) phenyl ether, while those of the anionic phosphate surfactant include mono-, di- or sesqui-(long-chain alkyl) (each $C_{8\sim22}$) phosphates, polyoxyethylene(1 to 6 mol)mono-, di- or sesqui-alkyl (each $C_{8\sim22}$) phosphates and salts of $C_{8\sim22}$ aliphatic carboxylic acid. Examples of the counter cation constituting the anionic surfactant include ions of alkali metals such as sodium or potassium and those of alkanolamines such as mono-, di- or tri-ethanolamine. Among these anionic surfactants, anionic sulfonate surfactants are preferable from the standpoint of resistance to hydrolysis, among which straight-chain or branched alkylbenzenesulfonates are particularly preferable from the standpoint of detergency and the like.

Examples of the nonionic surfactant include oxyalkylene adducts such as polyoxyethylene(1 to 20 mol) long-chain n- or sec-alkyl($C_{8\sim22}$) ether, polyoxyethylene(1 to 20 mol) alkyl($C_{8\sim22}$)phenyl ether and polyoxyethylene/polyoxypropylene block copolymers and alkanolamides of higher fatty acids and their adducts with an alkylene oxide.

The amount of the surfactant to be added is 1 to 20% by weight, preferably 3 to 15% by weight.

Simultaneous use of 0.5 to 10% by weight, preferably 2 to 6% by weight, of an anionic surfactant and 0.5 to 10% by weight, preferably 1 to 5% by weight, of a nonionic surfactant can give a cleanser having a further enhanced detergency.

According to the present invention, a di- or tri-carboxylic acid having 3 to 8 carbon atoms or a salt thereof may be added as a dispersion stabilizer. Examples thereof include malonic, malic, tartaric, citric and L-aspartic acids and salts thereof.

The amount of the di- or tri-carboxylic acid or its salt to be added is preferably 0.1 to 5%, still preferably 0.5 to 3%.

According to the present invention, the dispersion stability of the cleanser may be further enhanced by adding a sodium silicate such as sodium silicate No. 1, 2, 3 or 4, sodium orthosilicate, sodium sesquisilicate, sodium methasilicate or an alkaline earth metal salt such as magnesium sulfate to calcium chloride thereto together with the above dispersion stabilizer.

The liquid cleanser according to the present invention may contain silicon dioxide, aluminum oxide, aluminum hydroxide, magensium oxide, titanium oxide, silicon carbide, calcium carbonate, calcium phosphate, chromium oxide, corundum, emery, silica, quartz sand, calcite, dolomite or beads of a polymer such as polyvinyl chloride, polystyrene, polyethylene or ABS and, if necessary, an alkaline agent, solvent, hydrotrop, bactericide, perfume, pigment or dye, as far as they do not adversely affect the present invention.

Examples of the alkaline agent include organic ones such as ammonia, monoethanolamine, diethanolamine, triethanolamine and morpholine, alkali metal hydroxides such as sodium hydroxide and potassium hydroxide and salts of sodium or potassium with carbonic, pyrophosphoric, tripolyphosphoric or boric acid.

Examples of the solvent include monohydric aliphatic alcohols such as ethyl and butyl alcohols and glycols such as ethylene glycol, propylene glycol, polyethylene glycol and polypropylene glycol and ethers thereof with lower aliphatic alcohol such as methyl, ethyl, propyl or butyl alcohol.

Examples of the hydrotrope, include salts of p-toluenesulfonic, xylenesulfonic and cumenesulfonic acids, and urea.

The pH of the liquid cleanser is adjusted to neutrality or the alkaline side to thereby impart an excellent detergency thereto.

The liquid cleanser of the present invention exhibits excellent detergency and abrasiveness against a variety of dirts including denatured or burnt oil and soap scum of a bathtub and it hardly scratches the surface of an object. Further, the liquid cleanser is so excellent in dispersion stability that it can be used even after stored for a long period of time.

The second embodiment will be explained below.

The second embodiment preferably comprises 0.5 to 10 percent by weight of an anionic surfactant and 0.5 to 10 percent by weight of a nonionic surfactant such as a higher fatty acid alkanolamide and a polyoxyethylene secondary alkyl ether having 8 to 22 carbon atoms in the alkyl.

The present invention provides a liquid cleanser composition characterized by containing 1 to 20% by weight of a synthetic surfactant and (a) a crystalline aluminosilicate having an average particle size of 2 to 12μ and (b) calcium carbonate having an average particle size of 3 to 15μ with a weight ratio of (a) to (b) of between 10:90 and 50:50 and in a sum total of (a) and (b) of 20 to 70% by weight.

The crystalline aluminosilicate to be used in the present invention should have an average particle size of 2 to 12μ and particularly preferably has a content of particles having a size of 1μ or below of not more than 10% by weight and that of particles having a size of 15μ or above of not more than 20% by weight.

Although the crystalline aluminosilicate to be used in the present invention may be any of those described in Japanese Patent Laid-Open Nos. 50909/1976 and 5947/1980, the use of an aluminosilicate in the form of an aggregate of an interpenetration type formed of at least 30 crystals can give a cleanser exhibiting higher abrasiveness and less scratching than those of the cleanser of the prior art.

The reason why such an aluminosilicate is effective as an abrasive is presumably that it can come into contact with dirt at many points and because the force applied can be effectively transmitted.

The calcium carbonate to be used in the present invention should have an average particle size of 3 to 15μ and particularly preferably has a content of particles having a size of 1μ or below of not more than 15% and that of particles having a size of 20μ or above of not more than 20%.

If the particle size is too large, the resulting cleanser will significantly scratch the objective surface, while if the particle size is too small, the resulting cleanser will be so viscous that it will be uncomfortable to the touch in service.

The weight ratio of the crystalline aluminosilicate used to the calcium carbonate used must be between 10:90 and 50:50. If the weight ratio is outside this range, no synergistic abrasiveness will be attained.

The both abrasives (a) and (b) are added in a sum total of 20 to 70% by weight, preferably 30 to 60% by weight.

The composition of the present invention may further contain 0.05 to 1.5% by weight of a salt of an aliphatic carboxylic acid having 8 to 22 carbon atoms to thereby not only further enhance its abrasiveness and detergency but also reduce scratching of the objective surface.

If the amount of the aliphatic carboxylate added is less than 0.05%, no remarkable effect will be recognized, while if it exceeds 1.5% by weight, the resulting cleanser will exhibit lowered abrasiveness. It is particularly preferred that the amount is 0.1 to 0.7% by weight.

In the second embodiment of the invention, the aluminosilicate can be prepared in the same was as shown in the first one. The surfactant, the dispersion stabilizer and the other additives are used in the same way as shown in the first.

The liquid cleanser of the present invention exhibits excellent detergency and abrasiveness against a variety of dirts including denatured or burnt oil and soap scum of a bathtub and hardly scratches the surface of an object.

The preparation of crystalline aluminosilicates of the interpenetration type is illustrated in the following example.

Preparation Example 1

A solution of 107.2 g of a reagent grade sodium hydroxide in 70 g of water was placed in a 500-ml three-necked round-bottomed flask and heated to 50° C. In 197.9 g of aluminum hydroxide having a water content of 8.8% and an average particle size of 50 μm was added to the solution. The obtained mixture was heated under stirring and kept at its boiling point under reflux for 20 minutes to confirm the complete dissolution of the aluminum hydroxide. The obtained solution was cooled to 90° C., followed by the addition of 20 g of water at an ordinary temperature. Thus, a homogenous viscous supersaturated solution of sodium aluminate was obtained. Separately, 150 g of Sodium Silicate No. 3 ($Na_2O$: 9.42%, $SiO_2$: 22.99%, water: 61.59%) was placed in a 1-l three-necked flat-bottomed separable flask and heated on an oil bath to 80° C. The whole of the above supersaturated solution of sodium aluminate and 350 g of Sodium Silicate No. 3 were fed simultaneously into the separable flask with a microtube pump at a constant rate over a period of 60 minutes, while stirring the contents with a U-shaped stirring rod having a width of 9 cm and a length of 9 cm at a rate of 500 rpm. The temperature of the aqueous solution of sodium aluminate fed was 70° to 80° C., while that of the Sodium Silicate No. 3 fed was an ordinary one.

Although the formed sodium aluminosilicate gel temporarily became so hard during gelation that the stirring thereof was difficult, a homogeneous concentrated white slurry was finally obtained by continuing the feeding and the stirring. After the completion of the feeding, the mixture was kept at the same temperature under stirring for 30 minutes, heated to raise the temperature of 100° C. and kept at that temperature under stirring for 60 minutes. The stirring was stopped and the separable flask was immersed in water at an ordinary temperature to quench the contents. The solution mixture had a ratio of $Na_2O$ to $Al_2O_3$ to $SiO_2$ to $H_2O$ of 1.69:1:2:23.

The obtained slurry was white and excellent in fluidity in spite of its high concentration. The obtained crystal exhibited an X-ray diffraction pattern identical with that of zeolite 4A. The degree of crystallinity of the crystal as determined by calculating the relative intensity thereof to a standard crystal (Linde-4A) at a diffraction line of d of 2.98 Å (hkl=410, 322) was 94%. The ion exchange capacity of the crysal was 276.6 (mg of $CaCO_3$/g of anhydrous zeolite) which is not inferior to that of a commercially available zeolite, i.e., 271.6.

The water elutriation of the crystal revealed that the content of particles larger than 200 mesh therein was 9.2%.

Preparation Example 2

150 g of the zeolite 4A slurry prepared in Preparation Example 1 was placed in the same flask as that used in Preparation Example 1. 395.1 g of an aqueous solution of sodium aluminate prepared by the same manner as that described in Preparation Example 1 and 500 g of Sodium Silicate No. 3 were simultaneously fed into the flask with a microtube pump, while keeping the contents at 80° C. and stirring them at a rate of 500 rpm with the same stirring rod as that used in Preparation Example 1. After the completion of the feeding, the mixture was stirred for additional 20 minutes, heated to 100° C. and stirred at that temperature at a rate of 300 rpm for 45 minutes. After the completion of the crystallization, the flask was immersed in cold water to quench the contents. Thus, a concentrated white slurry excellent in fluidity was obtained. The relative diffraction intensity of the crystal to the standard at d of 2.98 Å was 88.7%, while the ion exchange capacity thereof was 272.0 (mg of $CaCO_3$/g of anhydrous zeolite). The water elutriation thereof revealed that the content of particle larger than 200 mesh therein was 13.2%. The slurry could be added as such to a slurry base for a powdered detergent. The solution mixture had a ratio of $Na_2O$ to $Al_2O_3$ to $SiO_2$ to $H_2O$ of 1.69:1:2:23.

Preparation Example 3

The same procedure as that described in Preparation Example 1 was repeated except that 197.9 g of aluminum hydroxide was dissolved in 216 g of a 48% aqueous solution of sodium hydroxide. The obtained zeolite slurry had a degree of crystallinity of 96.8% and an ion exchange power of 276.1 mg/g and contained particles larger than 200 mesh in a ratio of 10.8%. The slurry could be added as such to a slurry base for a powdered detergent. The solution mixture had a ratio of $Na_2O$ to $Al_2O_3$ to $SiO_2$ to $H_2O$ of 1.71:1:2:23.8.

Preparation Example 4

The gelation and the formation of zeolite were carried out in a similar manner to that described in Preparation Example 2 except that the feeding time of sodium aluminate and sodium silicate was 15 minutes. The obtained zeolite exhibited a degree of crystallinity as determined by X-ray diffractometry of 97.9%, an ion exchange capacity of 270.3 mg/g and a content of particles larger than 200 mesh of 8.6%. The slurry could be added as such to a slurry base for a powdered detergent. The solution mixture had a ratio of $Na_2O$ to $Al_2O_3$ to $SiO_2$ to $H_2O$ of 1.69:1:2:23.

Preparation Example 5

The gelation and the formation of zeolite were carried out in the same manner as that described in Preparation Example 1 except that the temperature of sodium aluminate, sodium silicate and aluminosilicate gel slurry in the preparation of aluminosilicate gel were kept at 80° C., 100° C. and 80° C., respectively. The obtained zeolite had a degree of crystallinity as determined by X-ray diffractometry of 85.3% and a content of particles larger than 200 mesh of 16.1%. The solution mixture has a ratio of $Na_2O$ to $Al_2O_3$ to $SiO_2$ to $H_2O$ of 1.69:1:2:23.

Preparation Example 6

243.1 g of sodium hydroxide having a water content of 4.3% was dissolved in 158.7 g of water to obtain an aqueous solution. 448.7 g of aluminum hydroxide having a water content of 4.76% and an average particle size of 55 μm was thrown into the solution. The obtained mixture was heated to 105° C. and kept at that temperature for about 20 minutes to obtain a yellow transparent viscous agueous solution of sodium aluminate, accompanied by foaming.

Separately, 198.4 g of aluminosilicate gel which had been preliminarily prepared was spread on the bottom of a reactor. 1133.8 g of Sodium Silicate No. 3 ($Na_2O$: 9.50%, $SiO_2$: 29.00%) and the whole of the aqueous solution of sodium aluminate prepared above were simultaneously fed into the reactor over a period of 60 minutes under vigorous stirring. After the completion of the feeding, 200 g of the formed aluminosilicate gel was taken out for the next synthesis and the residual part thereof was stirred for additional 15 minutes, heated to 105° C. and kept at that temperature for 20 minutes.

The obtained slurry was quenched with water to prevent the formation of hydroxysodalite. Thus, a zeolite 4A slurry having a concentration of 58% was obtained. The degree of crystallinity as determined by X-ray diffractometry was 96%, while the ion exchange capacity was 277.0 mg/g.

The slurry was an excellent one which can be added as such or after neutralization to a slurry base for a powdered detergent. The solution mixture had a ratio of $Na_2O$ to $Al_2O_3$ to $SiO_2$ to $H_2O$ of 1.70:1:2.00:22.1.

Preparation Example 7

64.3 g of sodium hydroxide having a water content of 4.3% was dissolved in 42.0 g of ion-exchanged water, followed by the addition of 118.7 g of aluminum hydroxide having a water content of 4.3% and an average particle size of 55 μm. The obtained mixture was heated to its boiling point and kept at the boiling point for 15 minutes to complete the dissolution. The obtained solution was cooled to a room temperature by allowing to stand. A slightly opaque viscous suspension was obtained.

Separately, 300 g of Sodium Silicate No. 3 ($Na_2O$: 9.42%, $SiO_2$: 28.99%, water: 69.57%) was placed in a 1-flask. The above suspension of sodium aluminate was gradually added to the flask through a dropping funnel over a period of about 30 minutes, while stirring the contents. The obtained gel was stirred for 15 minutes, heated to 90° C. and kept at that temperature for 60 minutes. The X-ray diffraction pattern of the obtained slurry was completely identical with that of zeolite 4A, while the ion exchange capacity was 265 mg/g. The solution mixture had a ratio of $Na_2O$ to $Al_2O_3$ to $SiO_2$ to $H_2O$ 1.70:1:2:22.1.

Preparation Example 8

The preparation of a zeolite slurry was carried out by the same manner as that described in Preparation Example 1 except that the amount of the water added in the preparation of sodium aluminate was 130 g instead of 20 g. The obtained slurry had a degree of crystallinity of 86% and an ion exchange capacity of 249 mg/g. The solution mixture had a ratio of $Na_2O$ to $Al_2O_3$ to $SiO_2$ to $H_2O$ of 1.69:1:2:28.0.

Preparation Example 9

57.2 g of sodium aluminate ($Al_2O_3$: 35.9%, $Na_2O$: 24.4%, $H_2O$: 39.7%) was dissolved in 27.1 g of ion-exchanged water to obtain a solution. Separately, 100 g of Sodium Silicate No. 2 ($Na_2O$: 14.5%, $SiO_2$: 35.0%, $H_2O$: 50.5%) was spread on the bottom of a 500-ml three-necked flask. The above solution was added to the flask under stirring. After the formation of a white sodium aluminosilicate gel, the mixture was allowed to stand for 15 mintues, heated to 105° C. and kept at the same temperature for 30 minutes. The obtained slurry was identified by X-ray diffractometry as a zeolite 4A having a high degree of crystallinity. The solution mixture had a ratio of $Na_2O$ to $Al_2O_3$ to $SiO_2$ to $H_2O$ of 1.84:1:2.1:26.6.

Preparation Example 10

The same procedure as that described in Preparation Example 9 was repeated except that a solution of 64.67 g of sodium aluminate in 24 g of water was added to 125 g of Sodium Silicate No. 2 to obtain a concentrated white slurry. This slurry was identified by X-ray diffractometry as a zeolite 4A having a high degree of crystallinity. The solution mixture had a ratio of $Na_2O$ to $Al_2O_3$ to $SiO_2$ to $H_2O$ of 2.0:1:2.5:29.4.

The invention will be illustrated in reference to working examples and comparative examples.

EXAMPLES 1 TO 4 AND COMPARATIVE EXAMPLES 5 TO 7

The compositions shown in Table 1 were prepared and examined for detergency and scratching as follows:

<Test Method>

Detergency

1. Dirt of denatured oil 1.0 g of a mixture of colza oil and carbon black with a weight ratio of 5:1 was applied to an iron piece (3×8 cm) and heated at 150° C. for 130 minutes to denature the mixture. The resulting piece was used as a test piece.

The test piece was rubbed by the use of 1 g of a sample with a urethane sponge under a load of 1 kg/30 $cm^2$ 30 times. The relative cleanness was determined based on the weight decrease of the test piece due to the rubbing and evaluated according the following five ranks:

| | relative cleanness (%) |
|---|---|
| 5 | 81 to 100 |
| 4 | 61 to 80 |
| 3 | 41 to 60 |
| 2 | 21 to 40 |
| 1 | 0 to 20 |

(Relative cleanness (%): determined by regarding the abrasiveness/detergency of a commercially available cleanser A as 50)

Commercially available cleanser A:

| | |
|---|---|
| LAS (sodium dodecylbenzenesulfonate) | 2.5% |
| lauroyl diethanolamide | 4% |
| calcium carbonate (average particle size 20μ) | 50% |

-continued

| | |
|---|---|
| water | the balance |

2. Dirt adhering to bathtub

A bathtub made of FRP and having inherent dirt which was adhering thereto and could not be rubbed out at all was cleansed by rubbing with a sponge impregnated with a detergent. The effect was determined by the observation with the naked eyes.

. Scratching

| | Relative cleanness (%) |
|---|---|
| 5 | 81 to 100 |
| 4 | 61 to 80 |
| 3 | 41 to 60 |
| 2 | 21 to 40 |
| 1 | 0 to 20 |

(Relative cleanness (%): determined by regarding the abrasiveness/detergency of a commercially available cleanser A as 50)

A surface of FRP or stainless steel, which is generally used as a material of a bathtub or a kit, was rubbed by the use of 1 g of a sample with a urethane sponge 30 times. Whether the resulting surface was scratched or not was determined by the observation with the naked eyes.

| | |
|---|---|
| ○ | not scratched |
| (Δ) | generally not scratched, but slightly scratched by hard rubbing |
| Δ | slightly scratched |
| x | scratched |

TABLE 1

| Component | | Composition No. | | | | | | |
|---|---|---|---|---|---|---|---|---|
| | | Examples | | | | Comparative Example | | |
| | | 1 | 2 | 3 | 4 | 5 | 6 | 7 |
| crystalline aluminosilicate | No. of crystals in an aggregate > 30 average particle size: 5μ | 20 | — | — | — | — | — | — |
| | No. of crystals in an aggregate > 30 average particle size: 10μ | — | 20 | 20 | — | — | — | — |
| | No. of crystals in an aggregate > 30 average particle size: 20μ | — | — | — | 20 | — | — | — |
| | No. of crystals in an aggregate: 1 to 10 average particle size: 4 > μ | — | — | — | — | 20 | — | — |
| silicon dioxide (average particle size: 6μ) | | — | — | — | — | — | 20 | — |
| calcium carbonate (average particle size: 8μ) | | — | — | 20 | — | — | — | 20 |
| Na dodecylbenzenesulfonate | | 3 | 3 | 3 | 3 | 3 | 3 | 3 |
| lauroyl diethanolamide | | 3.5 | 3.5 | 3.5 | 3.5 | 3.5 | 3.5 | 3.5 |
| malic acid | | 1.5 | — | — | — | — | — | 1.5 |
| water | | B* | B | B | B | B | B | B |
| relative detergency | denatured oil | 5 | 5 | 5 | 4 | 3 | 4 | 3 |
| | dirt adhering to bathtub | 5 | 5 | 5 | 5 | 3 | 3 | 3 |
| scratching | surface of stainless steel | ○ | ○ | ○ | ○ | ○ | (Δ) | ○ |
| | surface of FRP | ○ | ○ | ○ | (Δ) | ○ | x | ○ |

*the balance

EXAMPLES 8 TO 11 AND COMPARATIVE EXAMPLES 12 TO 17

The compositions were prepared as shown in Table 2 and examined in the same way as shown in Example 1, except that the test piece was heated at 165° C. for 115 mins in the test for dirt of denatured oil and the ranks 6 and 5 were 91 to 100 percent and 81 to 90 percent, respectively. Results are shown in Table 2.

EXAMPLE 18

The composition of the invention is improved in view of storage stability, since it changes little in viscosity, by further comprising a higher aliphatic alkanolamide and polyoxyethylene-C8 to C22 secondary alkyl ether in combination for the nonionic surfactant. This was experimentally supported below.

A composition was prepared from 3 wt. % of lauroyl diethanolamine, 2.5 wt. % of sodium dodecylbenzenesulfonate, 0.5 wt. % of sodium laurate, 0.5 wt. % of polyoxyethylenealkylether in which the average number of the added ethylene unit was 12 and the alkyl was branched and had 12 to 13 carbon atoms on the average, 10 wt. % of crystalline aluminosilicate having an average particle size of 8 microns and was of the interpenetration type and was an aggregate composed of 30 or more crystals, 40 wt. % of calcium carbonate having an average particle size of 6 microns, 2 wt. % of sodium carbonate, 0.5 wt. % of sodium malate, 0.3 wt% of glycerin and the balance of water. It was examined in the same way as shown in Example 1. Results follow. It had a viscosity of 2700 cps just after the preparation. After it has been allowed to stand at 20° C. for 1 month, it had that of 2700 cps. As to the storage stability, no separation was found in it even after it had been allowed to stand for 1 month at 50° C., 20° C. and minus 5° C.. It was evaluated to have a grade of 6 in the relative detergency test and then have a grade of o in the scratching test on the surface of FRP.

4. A liquid cleanser composition as claimed in claim 1 containing from 0.1 to 5 percent by weight of a dispersion stabilizer, said dispersion stabilizer being selected from the group consisting of di- and tri-carboxylic acids having 8 to 13 carbon atoms and salts thereof.

5. A liquid cleanser composition as claimed in claim 1 in which said liquid carrier is water.

6. A composition as claimed in claim 1, which further comprises calcium carbonate particles having an average particle size of 3 to 15 microns, the weight ratio of the crystalline aluminosilicate zeolite abrasive particles to the calcium carbonate particles ranging from 10/90 to 50/50, the total amount of the crystalline aluminosilicate zeolite abrasive particles and the calcium carbonate particles being from 20 to 70 percent by weight, based on the weight of the composition.

7. A composition as claimed in claim 6 in which said surfactant comprises from 0.5 to 10 percent by weight of an anionic surfactant and from 0.5 to 10 percent by weight of a nonionic surfactant.

8. A composition as claimed in claim 6, in which said surfactant comprises from 0.5 to 10 percent by weight of an anionic surfactant and from 0.5 to 10 percent by weight of a higher fatty acid alkanolamide and a polyoxyethylene secondary alkyl ether having 8 to 22 carbon atoms in the alkyl group.

9. A composition as claimed in claim 6, which further comprises 0.05 to 1.5 percent by weight of a salt of an aliphatic carboxylic acid having 8 to 22 carbon atoms.

10. A liquid cleanser composition as claimed in claim 6 containing from 15 to 25 percent by weight of said crystalline aluminosilicate zeolite abrasive particles and from 25 to 35 percent by weight of said calcium carbonate particles.

TABLE 2

| | | Example | | | | Comparative Example | | | | | |
|---|---|---|---|---|---|---|---|---|---|---|---|
| | | 8 | 9 | 10 | 11 | 12 | 13 | 14 | 15 | 16 | 17 |
| crystalline | (average particle size: 3μ) | — | — | — | — | — | — | — | — | — | — |
| aluminosilicate | (average particle size: 9μ) | — | — | — | — | 2 | 35 | — | 15 | 10 | — |
| | (average particle size: 8μ)* | 5 | 15 | 25 | 15 | — | — | — | — | — | — |
| | (average particle size: 15μ) | — | — | — | — | — | — | 10 | — | — | — |
| calcium | (average particle size: 5μ) | — | — | — | — | — | — | 35 | — | — | — |
| carbonate | (average particle size: 12μ) | 45 | 35 | 25 | 35 | 48 | 15 | — | — | — | 25 |
| | (average particle size: 20μ) | — | — | — | — | — | — | — | 30 | — | — |
| silicon dioxide | (average particle size: 6μ) | — | — | — | — | — | — | — | — | 30 | 35 |
| sodium dodecylbenzenesulfonate | | 2.5 | 2.5 | 2.5 | 2.5 | 2.5 | 2.5 | 2.5 | 2.5 | 2.5 | 2.5 |
| lauroyl diethanolamide | | 4 | 4 | 4 | 4 | 4 | 4 | 4 | 4 | 4 | 4 |
| sodium laurate | | — | 0.2 | 0.5 | 1.5 | — | 0.4 | — | — | — | 0.5 |
| water | | B | B | B | B | B | B | B | B | B | B |
| relative | dirt of denatured oil | 5 | 6 | 6 | 5 | 4 | 4 | 4 | 5 | 4 | 3 |
| detergency | dirt adhering to bathtub | 6 | 6 | 6 | 5 | 4 | 4 | 5 | 5 | 4 | 4 |
| scratching | surface of stainless steel | ○ | ○ | ○ | ○ | ○ | ○ | (Δ) | ○ | Δ | Δ |
| | surface of FRP | (Δ) | ○ | ○ | ○ | (Δ) | ○ | x | x | x | x |

*aluminosilicate in the form of an aggregate of an interpenetration type formed of at least 30 crystals, while the others are commercially available ones and have the number of crystals in an aggregate of less than 10.
**the balance

What is claimed is:

1. A liquid cleanser composition comprising from 1 to 20 percent by weight of a synthetic, organic surfactant, from 3 to 70 percent by weight of water-insoluble, synthetic, crystalline aluminosilicate zeolite abrasive particles each composed of an aggregate of at least 30 cubic aluminosilicate zeolite crystals penetrating into each other so that each particle has many corners, said crystalline aluminosilicate zeolite abrasive particles having an average particle size of 2 to 12 microns, said particles being dispersed in a liquid carrier.

2. A composition as claimed in claim 1, which comprises 3 to 40 percent by weight of said abrasive particles.

3. A liquid cleanser composition as claimed in claim 1 in which said crystalline aluminosilicate zeolite abrasive particles include less than 5 percent by weight of particles having a size of 40μ or larger.

11. A liquid cleanser composition as claimed in claim 6 in which said crystalline aluminosilicate zeolite abrasive particles include not more than 10 percent by weight of particles having a size of 1μ or below and not more than 20 percent by weight of particles having a size of 15μ or higher.

12. A liquid cleanser composition as claimed in claim 11 in which said calcium carbonate particles include not more than 15 percent by weight of particles having a size of 1μ or below and nor more than 20 percent by weight of particles having a size of 20μ or higher.

13. A method of cleaning a dirty surface of an object which comprises rubbing said surface with a liquid cleanser composition as claimed in claim 1.

* * * * *